July 19, 1927.

W. FIEGEL ET AL 1,635,987

CLOSING-IN MACHINE

Filed May 24, 1926

INVENTORS
William Fiegel
Winfield S. Enderich
BY
ATTORNEYS

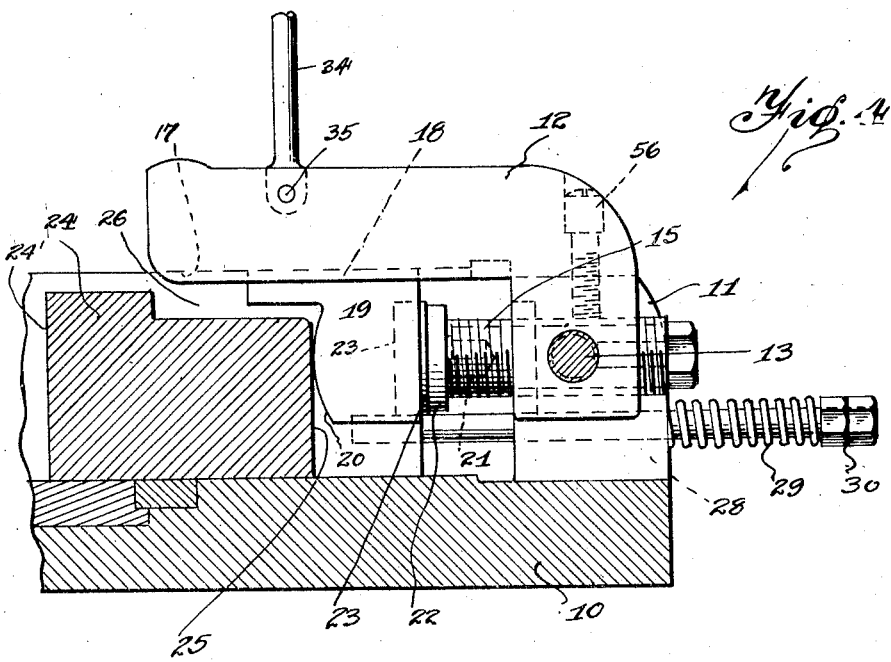
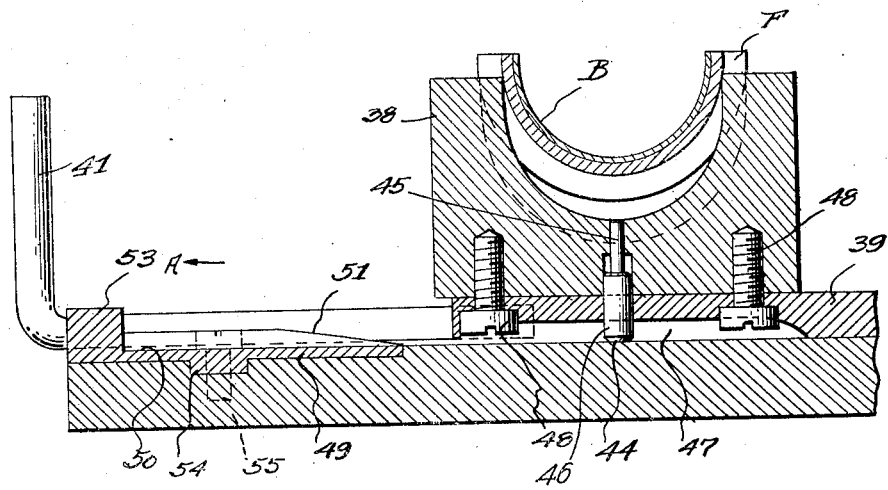

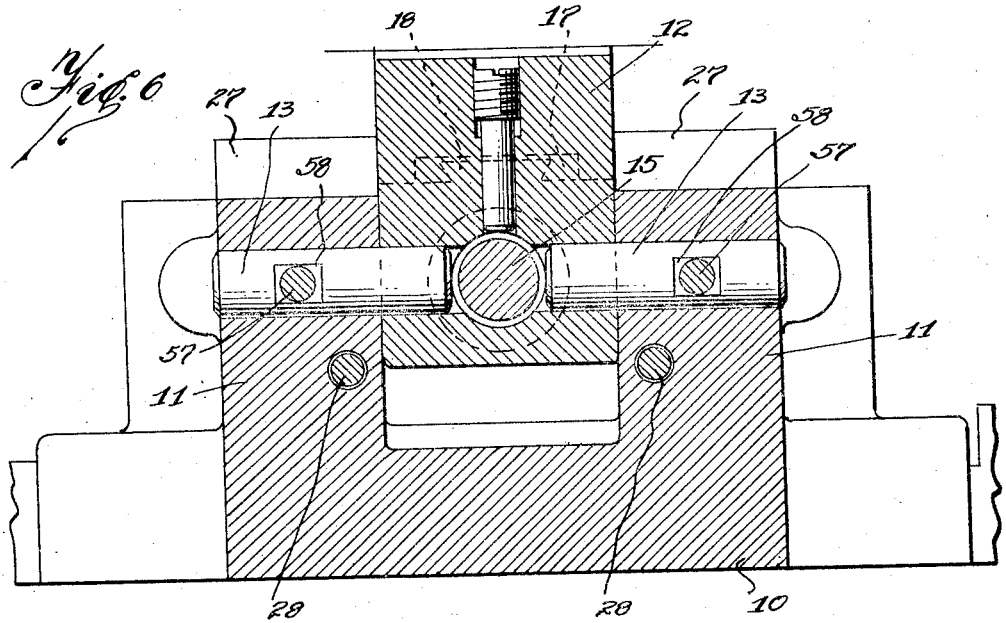
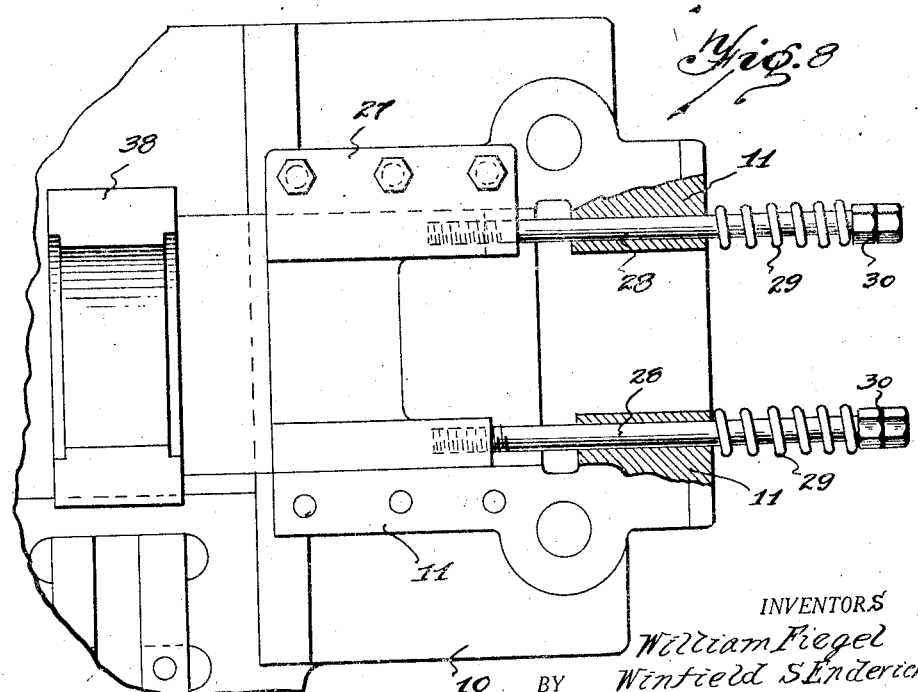

Patented July 19, 1927.

1,635,987

UNITED STATES PATENT OFFICE.

WILLIAM FIEGEL AND WINFIELD S. ENDERICH, OF DETROIT, MICHIGAN, ASSIGNORS TO BOHN ALUMINUM AND BRASS COMPANY, OF DETROIT, MICHIGAN, A CORPORATION OF MICHIGAN.

CLOSING-IN MACHINE.

Application filed May 24, 1926. Serial No. 111,400.

The invention relates to metal working and refers more particularly to a fixture for forming bearing, bushing or like segments.

In the manufacture of bearings, bushings, and the like, it is desirable to cast the bearings in cylindrical form from a suitable material such as brass, bronze, etc. This cylindrical casting is of a larger diameter than desired in the final product and is diametrically severed to produce two segmental bearing members. The edges of these members must then be machined and with this in view the cylindrical castings are made over-size, as aforesaid. Before this machining operation takes place the radii of the bearing segments are reduced to the final desired dimension, this closing-in operation providing bearing segments of greater than semi-cylindrical shape in transverse cross section so that when the edges are machined a true semi-cylindrical bearing segment of the desired radius will be obtained. Thus by reason of the closing-in operation sufficient material is afforded at the edges of the bearing segments to permit machining of the edges. Before the closing-in operation it was common practice to cast the cylindrical bearings to the final desired radial dimension necessitating destroying one-half of the casting, the cut being made so as to provide one of the resulting segments with sufficient material at the edges to permit machining to the final semi-circular cross section, the other of the segments being less than a semi-circle in cross section was scrapped.

One of the objects of the invention is to provide a fixture for closing-in the bearing segments, the fixture being particularly adapted, although not necessarily so limited, for closing-in bearing segments having flanged ends. In closing-in flanged bearings, considerable difficulty has been experienced in preventing buckling and undue distortion of the flanges. To this end, our invention provides a fixture having guide members which are moved, during the closing-in operation, to a position at each side of the die to constitute therewith guideways for the flanges to prevent longitudinal distortion thereof during the closing-in operation. Another feature of the invention consists in providing means for operating said guide members responsive to a movement of the closing-in ram or plunger.

With these and other objects in view, the invention resides in the novel features of construction and combination and arrangements of parts as more fully hereinafter described and claimed.

In the drawings;

Figure 4 is a fragmentary sectional view taken substantially on the plane indicated by line 4—4 of Figure 1;

Figure 5 is a sectional view taken substantially on the plane indicated by line 5—5 in Figure 1;

Figure 6 is a sectional view taken substantially on the plane indicated by line 6—6 in Figure 1;

Figure 8 is a fragmentary plan view partly in section of a portion of Figure 1.

Figure 1:
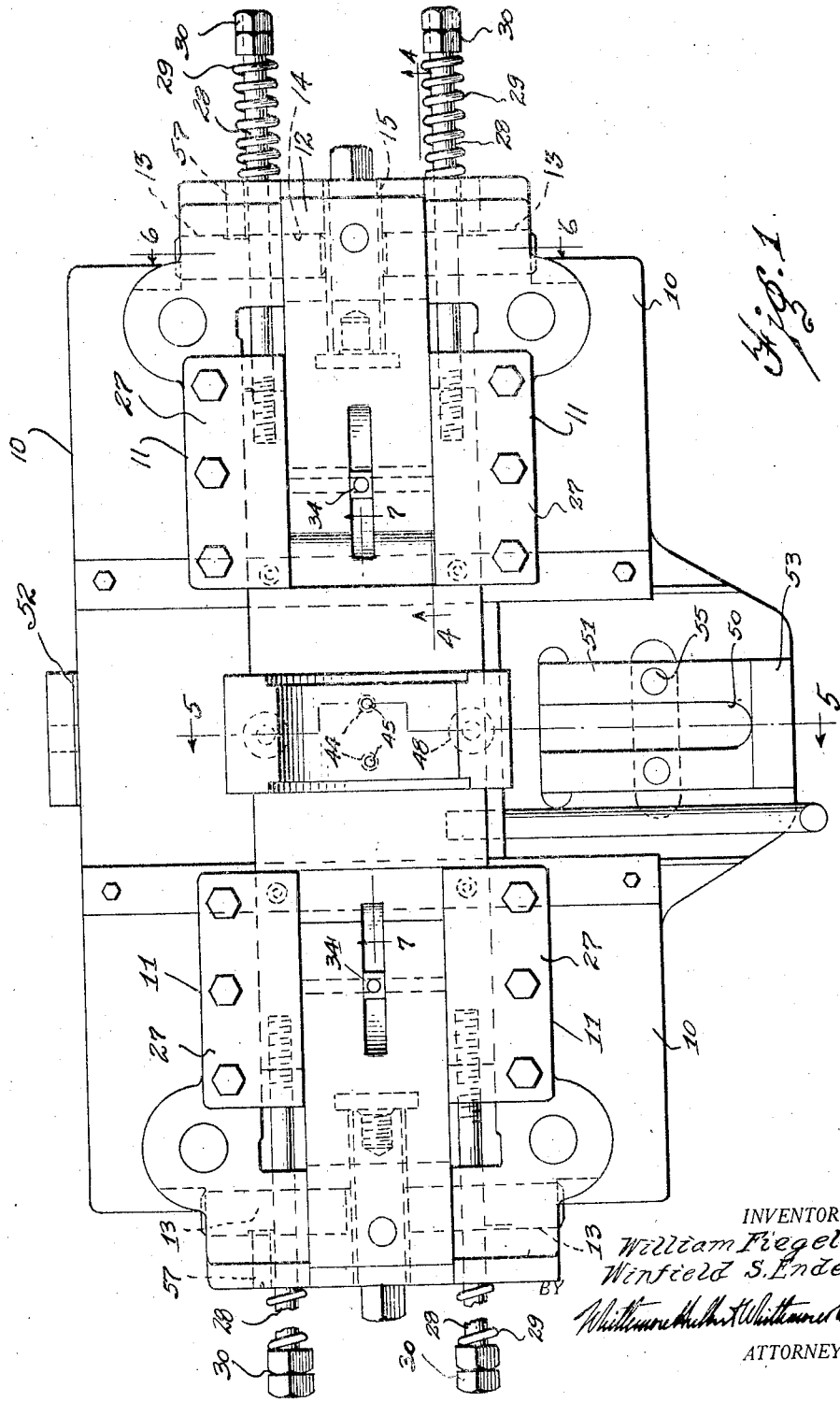
Figure 1 is a plan view of the apparatus with the ram of the press removed.
Figure 2:
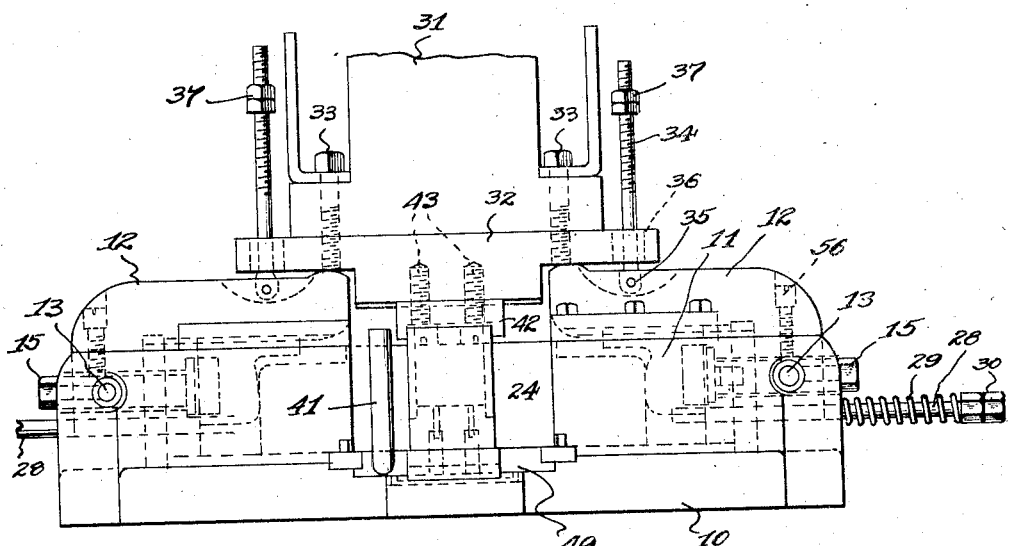
Figure 2 is a side elevation of the apparatus.
Figure 7:
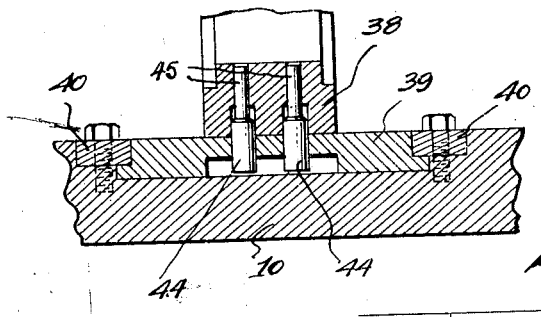
Figure 7 is a fragmentary sectional view taken substantially on the plane indicated by line 7—7 in Figure 1.
Figure 3:
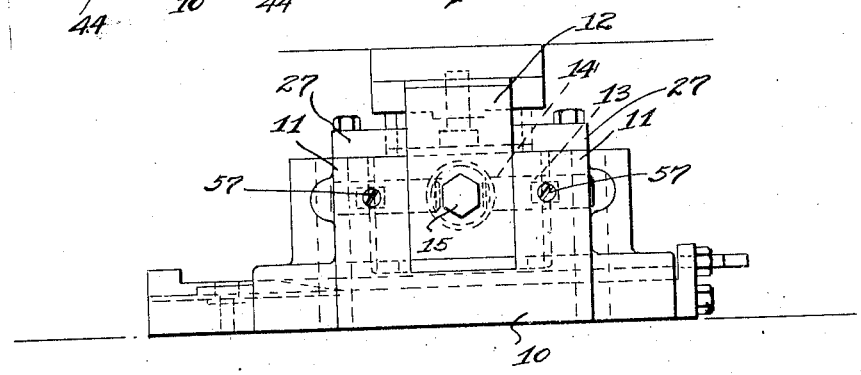
Figure 3 is an end elevation.

Referring now more particularly to the drawings wherein like reference characters indicate like parts it will be noted that the apparatus comprises essentially a base 10 usually formed by casting and provided with two pair of spaced walls projecting upwardly from the base 10 at opposite sides thereof to form two open-topped housings or supports for the operative parts of the apparatus yet to be described.

Pivotally mounted between each pair of walls 11 is a lever 12, each lever being pivotally supported for limited oscillation on a pair of pivot pins or shafts 13 extending laterally through the walls 11 and into a transverse aperture 14 formed in the lever 12. The inner ends of the pivot pins 13 stop short of the vertical center of the lever 12 to provide clearance for an adjusting element 15 in the form of a set screw which is threaded into the end of the lever 12 on a line coincident with the longitudinal axis of this lever.

The lever 12 is substantially L-shaped and is pivoted between the walls 11 at a point adjacent the end of its shorter leg, the longer leg of this lever being arranged in a substantially horizontal position parallel with the walls 11.

The under face of the longer leg of the lever 12 is provided with an under-cut groove 17 adapted to be engaged by a similarly shaped tongue 18 formed on the upper face of a cam member 19 so as to slidably unite this lever and cam. The cam member 19 is formed with a cam surface 20 at the lower forward edge thereof as more particularly illustrated in Figure 4. The normal position of the cam member 19 is spaced from the vertical shorter leg of the lever 12 and this cam lever is held thus spaced by means of the adjusting screw 15 which, as heretofore stated, is threaded into the vertical leg of the lever 12. The forward end of this adjusting screw 15 is recessed to receive the stud 21 of a disk 22 which disk bears upon a rubber insert 23 seated into the adjacent face of the cam member 19. By such an arrangement the adjusting screw 15 may be rotated to exert an adjusting pressure on the cam member 19, the disk 22 permitting the rotation of the set screw without the objectionable frictional contact which would result should the rotating end of the set screw directly engage the rubber insert.

Slidably mounted upon the base 10 between each pair of walls 11 is a guide member 24, this member being substantially U-shaped in plan view and provided with a vertical bearing surface 25 for engagement by the cam surface 20 of the cam 19 and also preferably with a shallow recessed portion 26 providing clearance for the forward end of the cam member 19. As mentioned, this member is slidably arranged upon the base 10 and between the side walls 11, which latter elements prevent lateral displacement of this member, vertical displacement thereof being prevented by means of cap plates 27 bolted to the upper ends of the walls 11. The rearwardly extending ends of the guide member 24 are provided with threaded apertures for engagement by stud rods 28 which extend rearwardly through apertures in the walls 11 and project beyond these walls so as as to receive coil springs 29. Nuts 30 are threaded into the ends of these rods to confine the springs 29 between them and the walls 11. The tension thus exerted by the springs 29 urges the guide member 24 outwardly away from the center of the apparatus or in other words, against the cam members 19.

The reference character 31 indicates the lower end of the ram of the press which may be vertically reciprocated in any known or approved manner, and to this ram a bumper plate 32 is attached as for instance by means of bolts 33. During its descent the bumper plate 32 is adapted to engage the inner ends of the levers 12 for the purpose of rocking these levers about their pivot pins 13 to thus move the inner ends of these levers downwardly. The levers 12 are normally maintained in a position in which their inner ends are upwardly angularly inclined by means of bolts 34 pivotally connected as at 35 to the ends of the levers 12 and passing upwardly through apertures 36 in the bumper plate. These bolts are provided with nuts 37 whereby engagement with the bumper plate may be effected on the upward movement of the ram to swing the arms 12 upwardly as aforesaid. The nuts 37 afford means for regulating the instant of engagement of the bumper plate.

When the levers 12 are rocked by the engagement of the bumper plate on the downward movement of the ram the cam surfaces 20 are brought into engagement with the corresponding surface 25 of the guide member 24 to thus move these members inwardly toward the center of the apparatus against the tension of their associated springs 29. Obviously both guide members move inwardly simultaneously as the operating apparatus is duplicated at both sides of the device and is simultaneously operated by the bumper plate 32 so that these guide members move to a position abutting the die wherein the vertical faces 24' thereof constitute with the adjacent portions of the die, a guide-way for the flanges of the segment.

The die 38 for receiving the work-piece or bearing to be closed-in is mounted upon a slide plate 39 which is seated for reciprocation in a suitably shaped recess in the base 10 and is held thus seated by means of slide plate strips 40. A handle 41 threaded into the slide plate may be grasped by the operator to move the slide plate and die from the position shown in Figures 1 and 5 wherein the work-piece is in place to be engaged by the ram, to a position at the bottom of Figure 1 or at the left of Figure 5 wherein the work-piece may be removed from the die and another work-piece inserted.

As previously described the work-pieces to be operated upon are herein shown as half bearings B formed usually with right angular end flanges F. The position of the segment or half bearing at the start of the closing-in operation is indicated in Figure 5, it being noticed that the bearing or segment is resting on top of the die 38 in position to be forced into engagement therewith by means of the closing-in ram or plunger. The closing-in ram or plunger 42 is secured by means of bolts 43 to the bumper plate 32. As the closing-in ram or plunger 42 descends, the bumper plate 32 engages the levers 12 to move the guide members 24 inwardly to a position in which they abut the adjacent sides of the die 38 whereupon the surfaces 24' are spaced slightly from the flanges F on the half bearing B and constitute confining or guide walls for preventing any buckling or distortion of these flanges in an outward direction due to the closing-in of the bearing B.

To facilitate the ready removal of the bearing or segment from the die after the closing-in operation knock-out pins 44 are provided which pins as herein shown may comprise relatively reduced end portions 45 adapted to be projected upwardly through the die for displacing the finished segment, the lower ends 46 of the pins projecting downwardly into a space 47 formed by recessing the slide plate to which the die is secured by means of bolts 48. For causing an upward movement of the knock-out pins 44 during the movement of the die to its inoperative or loading position there is provided a casting 49 suitably secured to a recessed portion of the base in the path of travel of the slide plate 39. This casting may be provided with a centrally arranged slot or recess 50 to provide clearance for the heads of the attaching bolts 48 and also with spaced cam surfaces 51 adapted to be engaged by the lower ends of the pins 44. Consequently as the slide plate and die are moved by means of the handle 41 in the direction of the arrow A in Figure 5 the pins 44 will ride up upon the cam surfaces 51 to thus project the ends 45 of these pins upwardly against the bearing or segment B to unseat the same thus permitting its ready removal. Thereafter a new bearing or segment B is placed in position upon the die and the die moved rearwardly again into a position coincident with the guide members 24 and the closing-in ram or plunger 42. The rearward movement of the slide plate and die is arrested by means of a stop plate 52 secured to the edge of the base at the end of the slideway in which this slide plate moves. The forward movement of the slide plate is arrested by means of a stop 53 which may conveniently be formed integrally with the casting 49. The alignment of the casting 49 may be insured by forming on its under surface a key portion 54 which seats in a suitable recess formed in the base, the casting may then be secured in position by means of bolts 55.

When the proper position of the cam member 19 has been determined by means of an adjustment of the bolt 15 the bolt 15 may be locked in its adjusted position by means of a lock screw 56. The rubber inserts 23 are compressible to permit of a relative movement between each lever 12 and cam 19 when, after the guide member 24 has been arrested by engagement with the die or work-holder a further movement is imparted to the lever 12 by the bumper plate. Thus, the position of each cam 19 may be initially adjusted to insure a complete movement of each guide member 24 and any excess movement of the parts can be compensated for by means of these compressible inserts. The assembling of the apparatus is facilitated by the construction which includes the pivot pins 13 insertable laterally through the walls into the transverse recess 14 of the lever. In order to hold these pivot pins against accidental displacement lock pins 57 are provided which are threaded into the rear ends of the walls 11 and engage flattened surfaces 58 on the pins 13.

The operation of the device will be readily apparent from the foregoing description from which it will be seen that the segment or bearing to be closed-in is placed upon the die member whereupon this die member is moved into a position under the closing-in ram or plunger 42. Then upon the descent of the ram, levers 12 are rocked about their pivots 13 to cause an operative engagement between the cam members 19 and the guide members 24 to move these members into operative position whereby they engage the die 38 with the faces 24' spaced from the flanges F of the segment to be closed-in. Simultaneously the plunger 42 is engaging the bearing to force the same down into engagement with the die whereby the bearing is forced to assume its final shape of a true semi-circle in transverse cross section. As the ram of the press moves upwardly levers 12 are rocked about their pivots by means of the bolts 34 thereupon moving cam surfaces 20 from operative engagement with the adjacent surfaces of the members so that springs 29 may function to retract these members. The slide carrying the die is then moved to its idle position by means of the handle 41, during which movement pins 44 are projected upwardly to free the bearing or segment B from the die member.

To those skilled in this art many changes in both the unessential details and in the more important elements of the apparatus will be obvious and it should therefore be understood that the invention contemplates such changes in details of construction and rearrangement of parts as may come within the purview of the accompanying claims.

What we claim as our invention is:

1. A fixture for closing-in a semi-cylindrical bearing or like segment having flanged ends comprising a die for holding the bearing and a movable ram for closing-in the same, means movable to a position adjacent the flanged ends of the segment for preventing distortion of said flanged ends during the close-in operation, and means responsive to the movement of the ram for actuating the said means.

2. A fixture for closing-in a semi-cylindrical bearing or like segment comprising a die for receiving the segment, a reciprocable ram for imparting a blow to the segment when positioned in the die for closing-in the same, means permitting movement of the die in a direction substantially transversely to the path of movement of the ram for positioning the die in operative and inoperative positions respectively, and means responsive to a movement of the die toward said inoperative position for ejecting the segment previously closed-in from the die.

3. A fixture for closing-in a semi-cylindrical bearing or like segment comprising a die fo receiving the segment, a reciprocable ram for imparting a blow to the segment when positioned in the die for closing-in the same, means premitting movement of the die in a direction substantially transversely to the path of movement of the ram for positioning the die in operative and inoperative positions respectively, end guides, means for moving said end guides relative to each other for protecting the ends of the segment when in the said operative position, and means responsive to a movement of the die toward said inoperative position for ejecting the segment previously closed-in from the die.

4. A fixture for closing-in a semi-cylindrical bearing or like segment comprising a die for holding the bearing and a movable ram for closing-in the same, means movable to a position adjacent the ends of the segment for guiding the ends of the segment during the closing-in operation, and means responsive to the movement of the ram in its opposite directions respectively for advancing and releasing said means.

5. A fixture for closing-in a semi-cylindrical bearing or like segment having flanged ends comprising a base, a die for receiving the segment, a reciprocable ram for closing-in the same when the segment is positioned in the die, a guide slidably mounted on said base, and means for moving the guide into engagement with the die and adjacent the flanged end of the segment for preventing distortion thereof longitudinally of the bearing when the closing-in operation takes place.

6. A fixture for closing-in a semi-cylindrical bearing or like segment comprising a movable ram for imparting a blow to the segment for closing-in the same, guides for protecting the ends of the segment during the closing-in operation, means for adjusting said guide means, and means responsive to the movement of the ram for actuating the said guide means.

7. A fixture for closing-in a semi-cylindrical bearing or like segment having flanged ends comprising a die and a movable ram for imparting a blow to the segment for closing-in the same, confining guides movable to a position spaced from the flanged ends of the segment, and adjustable means for simultaneously moving said guides toward each other into operative position.

8. A fixture for closing-in a semi-cylindrical bearing or like segment having flanged ends comprising a bearing holding die and a movable ram for imparting a blow to the segment for closing-in the same, confining guides for the said flanged ends of the segment, and cam means for simultaneously moving said guides toward each other into operative position.

9. A fixture for closing-in a semi-cylindrical bearing or like segments having flanged ends comprising a die and a movable ram for imparting a blow to the segment for closing-in the same, abutments constituting confining guides for the said flanged ends of the segment, and adjustable cam means for simultaneously moving said abutments toward each other into operative position prior to the closing-in operation.

10. A fixture for closing-in a semi-cylindrical bearing or like segment having flanged ends comprising a movable ram for imparting a blow to the segment for closing-in the same, confining guides for the said flanged ends of the segment, and cam and lever means for simultaneously moving said guides toward each other into the said clamping position.

11. A fixture for closing-in a semi-cylindrical bearing or like segment having flanged ends comprising a movable ram for imparting a blow to the segment for closing-in the same, confining guides for the flanged ends of the segment for protecting the segment flanges during the close-in operation, and cam and lever means responsive to the movement of the ram for actuating the said confining guides.

12. A fixture for closing-in a semi-cylindrical bearing or like segment having flanged ends comprising a movable ram for imparting a blow to the segment for closing-in the same, confining guides for the flanged ends of the segment for protecting the segment flanges during the closing-in operation, and adjustable cam and lever means responsive to the movement of the ram for actuating the said confining guides.

13. A fixture for closing-in a semi-cylindrical bearing or like segment comprising a die for receiving the segment, a reciprocable ram for imparting a blow to the segment when positioned in the die for closing-in the same, means permitting movement of the die in a direction substantially transversely to the path of movement of the ram for positioning the die in operative and inoperative positions respectively, and means responsive to a movement of the die toward said inoperative position for ejecting the segment previously closed-in from the die, said latter means including cam actuated ejector pins.

14. A fixture for closing-in a semi-cylindrical bearing or like segment comprising a die for receiving the segment, a reciprocable ram for imparting a blow to the segment when positioned in the die for closing-in the same, a slide upon which said die is mounted permitting movement of the die in a direction substantially tranversely to the path of movement of the ram for positioning the die in operative and inoperative positions respectively, a cam in the path of movement of said slide, and an ejector pin carried by said slide and engageable with said cam during the movement of the die to inoperative position for ejecting from the die the segment previously closed-in.

15. In a device for closing-in semi-cylindrical bearings or like segments having flanged ends, the combination with means for closing-in such segments of means cooperating with said closing-in means for preventing distortion of said flanges during the closing-in operation.

16. In a device of the class described, the combination with a ram and die for closing-in semi-cylindrical bearings or like segments provided with flanged ends, of guide means associated with said die for preventing distortion of said flanges during the closing-in operation of said ram.

17. In a fixture for closing-in semi-cylindrical bearings and the like having a flanged end, the combination with a die adapted to receive a bearing with the flanged end overlying the side of the die and a ram for forcing said bearing into the die to close-in the same, of an abutment member arranged adjacent the said side of the die and cooperating therewith during the closing-in operation to prevent lateral distortion of said flange.

18. In a device for closing-in semi-cylindrical bearings or like sections having flanged ends, the combination with a die adapted to receive a bearing with the flanges thereof overlying the ends of said die and a ram for forcing said bearing into said die, of flange guiding means cooperating with the said ends of the die for preventing distortion of the flanges during the closing-in of the bearing.

In testimony whereof we affix our signatures.

WILLIAM FIEGEL.
WINFIELD S. ENDERICH.